Oct. 22, 1957
R. D. JAMES ET AL
2,810,302
REVERSIBLE INCREMENTAL MECHANISM
Filed Nov. 30, 1954
2 Sheets-Sheet 1
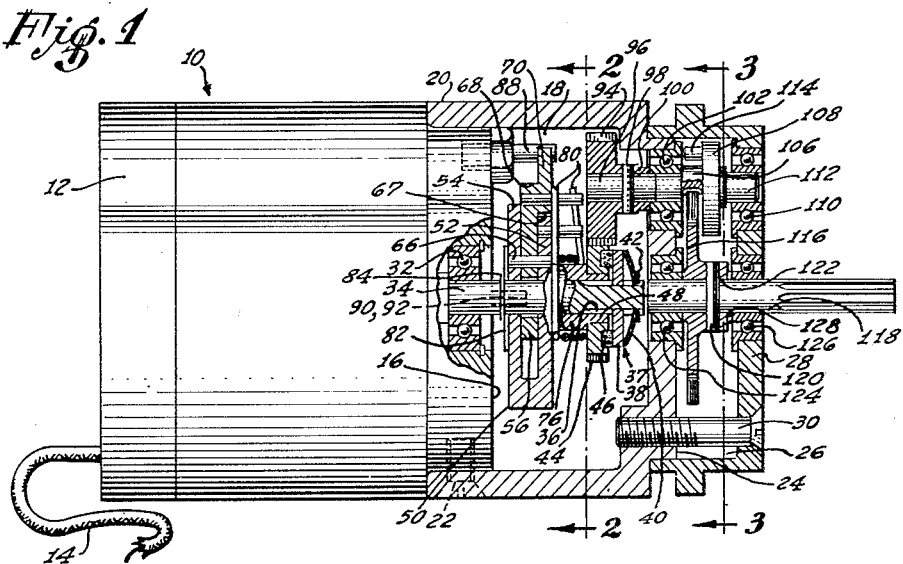
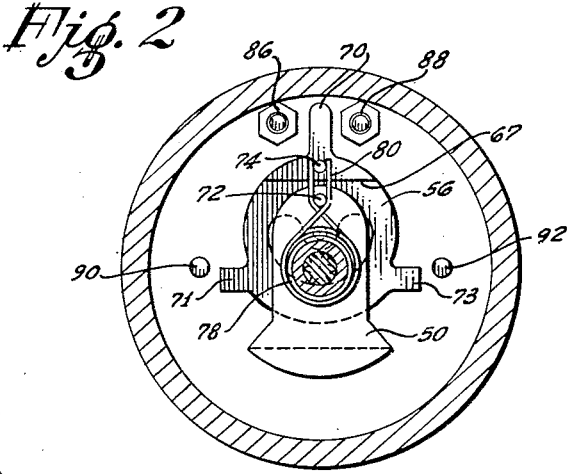
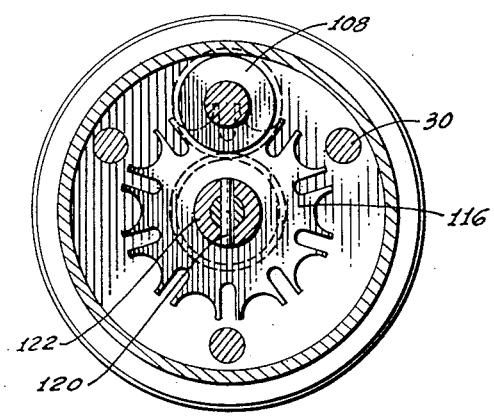
INVENTORS:
Frank L. Prendergast
Richard D. James
By Hubert E. Metcalf
Their Patent Attorney INVENTORS:
Frank L. Prendergast
Richard D. James By Herbert E. Metcalf
Their Patent Attorney United States Patent Office 2,810,302
Patented Oct. 22, 1957

2,810,302

REVERSIBLE INCREMENTAL MECHANISM

Richard D. James, Manhattan Beach, and Frank L. Prendergast, Palos Verdes Estates, Calif., assignors to Northrop Aircraft, Inc., Hawthorne, Calif., a corporation of California Application November 30, 1954, Serial No. 472,094

11 Claims. (Cl. 74—565)

This invention has to do with electrically energized instruments and more particularly with incremental or stepper motors.

Stepper motors are used to control accurately functioning mechanisms such as computing devices, servo systems, and electrical relay systems that may be found in communication equipment and similar applicable structure.

Some stepper motors require structure that rotates a shaft through a limited but accurately defined path of travel and an electrical signal may not be immediately or subsequently transmitted unless the defined distance of travel is completed.

Devices of the kind to which this invention relates should operate on the electrical power provided, be so constructed that they may be readily incorporated in place of other previously used devices in a wide variety of equipment and should be readily adapted to the special needs of whatever type of equipment the device is to be used.

Therefore, the principal object of this invention is to provide an electrical pulse actuated stepper motor that will operate very accurately for an extended period of time without missing pulses.

Another object of this invention is to provide an electrical pulse actuated stepper motor capable of use in a variety of equipment, that may be readily actuated in one or the other direction or alternately in one direction and then the other or in any combination thereof.

Another object of this invention is to provide an electrical pulse actuated stepper motor that will impose a sinusoidal motion that is not reactive to inertia or overhauling loads and results in a smooth acceleration and deceleration action.

A yet further object of this invention is to provide an electrical pulse actuated stepper motor that will impose a sinusoidal motion that results in there being a minimum of wear on load components and vibration in the driven load, due to the fact that there is no impact at start or stop of the power transmission portion of said stepper motor.

Figure 1 is a fragmentary, cross-sectional view of a stepper motor having embodied therein the present invention.

Figure 2 is a transverse, cross-sectional view taken on lines 2—2 in Figure 1 looking in the direction indicated and illustrating the escapement pawl and assembly.

Figure 3 is a transverse, cross-sectional view taken on line 3—3 in Figure 1 looking in the direction indicated, but illustrating the pin on the Geneva pinion in engagement with the Geneva wheel.

Figure 4:
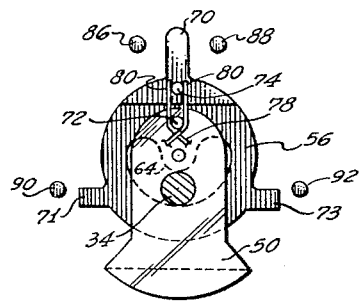
Figure 5:
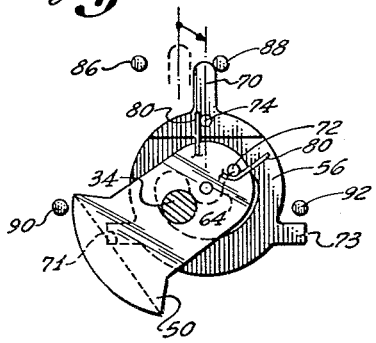
Figure 6:
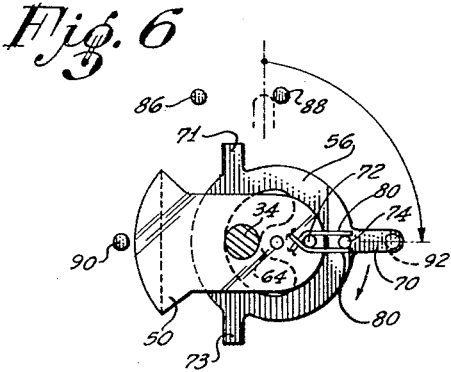

Figures 4 to 9 inclusive are views similar to Figure 2 but illustrating in sequence the operative steps of the escapement pawl and assembly.

Referring to the drawings, 10 designates a stepper motor having enclosed within a housing 12 a conventional torque motor energized by electrical pulses transmitted thereto through electrical lead 14.

The housing 12 provides a partition 16 that separates a compartment 18 from the torque motor located in the former. Compartment 18 is formed primarily by a cap 20 that is secured to housing 12 by a plurality of screws 22. The cap 20 in turn provides a wall 24 that separates a chamber 26 from compartment 18. Chamber 26 is formed by another cap 28 that is secured to cap 20 by a plurality of screws 30.

Extending outwardly of housing 12, through partition 16 and supported therein by a bearing 32, and into compartment 18 is an elongated driving shaft 34 that is rotatably actuated by the torque motor. The free end of the shaft 34 has a plurality of serrations 36 therein that receives the friction clutch broadly designated 37 and comprising a circular plate 38 and a concave-convex spring 40 both of which have a central opening therethrough that conforms to the configuration of the serrations 36 in the manner illustrated in Figure 1 of the drawings. The plate 38 and the spring 40 are freely slidable on shaft 34 but, due to the serrations, are rotatable therewith.

Plate 38 and spring 40 are prevented from sliding off the free end of the shaft 34, by snap ring 42 secured to the latter. Due to the spring 40 abutting against snap ring 42 the plate 38 is continuously urged toward partition 16.

Secured to the plate 38 and urged under the impetus of spring 40 into frictional contact with a ring groove in gear 44 is a cork ring 46.

The gear 44 is pressed or otherwise secured to a hub 48 of a U-shaped driver 50. Disposed between the legs 52 and 54 of driver 50 is a generally ring-shaped escapement pawl 56 that is free to rotate about shaft 34.

Extending from the inner periphery of the pawl 56 is an arcuate projection 64 that has an opening therethrough which registers with similar openings in legs 52 and 54. A pin 66 is positioned in the said openings and the pawl 56 pivots thereabout.

Pawl 56 has an offset portion thereon that results in there being shoulders 67 and 68, that permit sufficient clearance of leg 52, and stop pins to be hereinafter described, and a finger projection 70. Projecting from the outer periphery of pawl 56 in a spaced apart relationship are a pair of stop projections 71 and 73.

Pressed into an opening in leg 52 adjacent the free end thereof and into an opening in pawl 56, between shoulder 68 and finger 70, and extending outwardly toward gear 44, are pins 72 and 74 respectively.

Between the hub 48 and leg 52 is an enlargement 76 about which is coiled a spring 78 that has integral therewith a pair of arms 80. One arm 80 is disposed on one side of pins 72 and 74 and one is disposed on the other in the manner illustrated in Figure 1 of the drawings.

Located on shaft 34 between leg 54 of driver 50 and partition 16 is a thrust washer 82 that is held spaced from partition 16 by a snap ring 84 similar to 42.

Due to the influence of spring 40 the driver 50 is urged to bear against the aforementioned thrust washer 82.

Secured in partition 16 are a pair of spaced apart deflecting pins 86 and 88 and a pair of stop pins 90 and 92. The stop pins are shorter than the deflecting pins in order that the finger 70 may clear them when the driver 50 and pawl 56 are rotated.

Intermeshing with gear 44 in a one to one ratio is another gear 94. Gear 94 is secured to serrated shaft 96 by a pin 98 extending through an opening in a hub 100 that registers with an opening in the shaft.

The shaft 96 is supported in a ball bearing 102 and the latter is in turn mounted in wall 24.

Shaft 96 has integral therewith a crescent shaped Geneva lock offset 106; the latter also being integral with a Geneva pinion 108 that is supported in a ball bearing 110 by a stub shaft 112.

Offset from the axis of rotation of pinion 108 is a pin 114 that engages a Geneva wheel or gear 116; the latter being secured to a shaft 118 by a pin 120 extending through an opening in a hub 122 that registers with an opening in the shaft 118. The shaft is supported in wall 24 and cap 28 by ball bearings 124 and 126 respectively and maintained properly spaced from cap 28 by a spacer 128.

It is to be understood that although the above description refers to gears 44 and 94 as being in a one to one ratio the function can be and is easily altered. Further reference is made to a pair of deflecting pins 86 and 88 and stop pins 90 and 92. By way of example to show how an alteration can be accomplished, the gear ratio can readily be changed to two to one and another pair of deflecting pins can be secured in partition 16 spaced 180° from those shown. As a result of this modification the driver and pawl would proceed through a half cycle of rotation while at the same time the Geneva motion would proceed through exactly one step. Further the gear ratio could conceivably be increased to four to one and the stop pins and deflecting pins be spaced 90° apart relative to each other. Then the driver and pawl would proceed through a quarter rotation and again the Geneva motion would be advanced exactly one step.

The operation of the stepper motor is as follows and attention is directed to Figures 4 to 9 inclusive.

Figure 4 illustrates the driver 50 and pawl 56 in the normal position between deflecting pins 86 and 88 before the torque motor is energized. It is also to be noted that stop projections 71 and 73 are spaced inwardly from stop pins 90 and 92 and below the axis of rotation of shaft 34.

When the torque motor is energized through electrical leads 14, the shaft 34 is caused to rotate as well as the friction clutch 37 comprising plate 38, spring 40, snap ring 42 and cork ring 46. The clutch is urged against gear 44 by spring 40 which results in the gear being rotated along with shaft 34. Due to the fact that the gear is secured to the hub 48 of the driver 50; the latter as well as the pawl 56 is also caused to rotate. The gear 94 intermeshing with gear 44 is also caused to rotate which in turn causes rotation of the Geneva pinion 108. As the structure is viewed in Figure 1 it may be determined that the Geneva lock 106 is in engagement with the Geneva wheel 116 preventing rotation of the latter.

As the driver 50 and pawl 56 proceed through rotation the projection 70 strikes deflecting pin 88 which retards rotation of pawl 56. The driver 50 continues through the path of rotation in the manner illustrated in Figure 5 of the drawings resulting in distending of the arms 80 of the spring 78. The aforementioned continued rotation pulls the pawl 56 from the dotted line position shown in Figure 5 to the solid line position and the stop projection assumes a position under stop pin 92 as the structure is viewed in Figure 5. Continued rotation of the driver 50 and pawl 56 results in releasing the projection 70 from deflecting pin 88 and the spring 78 pulls the pawl 56 to the radially extended position seen in Figure 6 of the drawings. However, the friction clutch contacting gear 44 damps a great deal of the vibration and shock that results from the sudden release of the pawl 56 from the position shown in Figure 5. While the driver 50, pawl 56 and gear 44 are rotating a quarter turn clockwise, the gear 94, pinion gear 108 and pin 114 are rotating a quarter turn counter-clockwise.

When the driver 50 and pawl 56 have rotated diametrically opposite to deflecting pins 86 and 88, the pin 114 on pinion 108 has engaged the Geneva wheel 116 and rotated it through one-half of a complete step, in the manner illustrated in Figure 3 of the drawings, and the crescent shaped stop 106 of course has been rotatably disengaged from wheel 116.

Due to the fact that the projection 70 is offset, it is capable of rotating past the shorter stop pins 90 and 92, but engages the deflecting pins 86 and 88.

Figure 7:
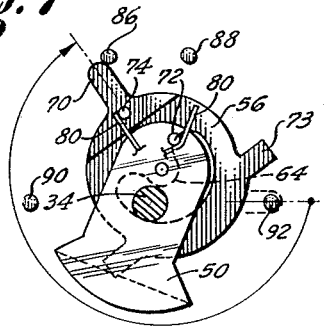

As the driver and pawl are rotated further the projection 70 engages deflecting pin 86 in the manner illustrated in Figure 7 of the drawings. The driver 50, pawl 56 and spring 78 assume a position similar to that illustrated in Figure 5. The pin 114 on pinion 108 has rotated the Geneva wheel 116 through one complete step and the Geneva lock 106 is again in partial engagement with the Geneva wheel 116 to prevent further rotation.

Figure 8:
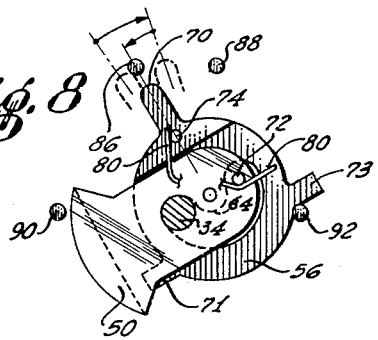
Figure 9:
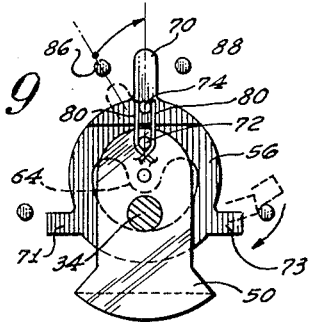

Further rotation of the driver 50 and pawl 56 causes the stop projection 73 to assume the stop pin 92 contacting relationship illustrated in Figure 8. The pawl 56 and projection 70 is urged under the rotative force imposed by the torque motor from the dotted line position to the dotted line position indicated by the longer of the two arrows seen in the aforementioned Figure 8. Continued rotative force, after the stop projection 73 is in the aforementioned position, urges the pawl 56 to the full line position illustrated and indicated by the shorter of the two arrows. As long as there is a rotative force applied to the pawl 56 when in the last mentioned position, the shaft 34, gears 44 and 94, and the Geneva motion are effectively locked against further rotation. Therefore, in order for there to be another subsequent step of rotation taken by the Geneva wheel the torque motor must be de-energized which results in releasing the torque imposed on the shaft 34, driver 50 and pawl 56. This release permits the spring 78 to urge the pawl 56 and driver 50 to the radially extended position illustrated in Figure 9 which shows the driver 50 and pawl 56 returned to the normal inoperative position. The projection 73 is also released from stop pin 92 by virtue of the action of spring 78 and proceeds from the dotted line positions shown in Figure 9 to the full line position. A cycle of rotation has been completed. The operation just described will apply as well to a counterclockwise rotation and the steps of operation would be identical to those just made.

As the pawl 56 proceeds from position to position there is a certain amount of shock and vibration. The friction clutch 37 effectively damps this result and does not permit the same to be transmitted to the Geneva motion.

Further if the gear ratio aforementioned were changed the operation would be the same.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An incremental motion control comprising a housing; deflecting pins and at least one stop pin on said housing; a rotatable shaft in said housing having torque and torque release applied thereto; a pawl that embraces said shaft; a finger on said pawl that engages said deflecting pins and a stop projection on said pawl that engages said stop pin to lock said shaft against rotation until torque release is applied; means on the shaft and rotatable therewith that rotates said pawl when torque is applied and diminishes the vibratory shock of the pawl as it is rotated; and a rotatable driven assembly interconnected to said shaft and rotatable therewith.

2. An incremental motion control comprising a housing; deflecting pins and at least one stop pin on said housing; a rotatable shaft in said housing having torque and torque release applied thereto; a spring loaded pawl that embraces said shaft; a finger on said pawl that engages said deflecting pins and a stop projection on said pawl that engages said stop pin to lock said shaft against rotation until torque release is applied; means on the shaft and rotatable therewith that rotates said pawl when torque is applied and diminishes the vibratory shock of the pawl as it is rotated; and a rotatable driven assembly interconnected to said shaft and rotatable therewith.

3. An incremental motion control comprising a housing; deflecting pins and at least one stop pin on said housing; a rotatable shaft in said housing having torque and torque release applied thereto; a pawl that embraces said shaft; a finger on said pawl that engages said deflecting pins and a stop projection on said pawl that engages said stop pin to lock said shaft against rotation until torque release is applied; means on the shaft and rotatable therewith that rotates said pawl when torque is applied and diminishes the vibratory shock of the pawl as it is rotated; and a rotatable driven assembly interconnected to said shaft and rotatable therewith; said means being a friction clutch.

4. An incremental motion control comprising a housing; a rotatable shaft in said housing having torque and torque release applied thereto; a pawl that embraces said shaft; means on the shaft and rotatable therewith that rotates said pawl when torque is applied and diminishes the vibratory shock of the pawl as it is rotated; a rotatable driven assembly interconnected to said shaft and rotatable therewith; and elements on said housing that interrupts the rotation of said pawl and shaft.

5. An incremental motion control comprising a housing; a rotatable shaft in said housing having torque and torque release applied thereto; a pawl that embraces said shaft; means on the shaft and rotatable therewith that rotates said pawl when torque is applied and diminishes the vibratory shock of the pawl as it is rotated; a rotatable driven assembly interconnected to said shaft and rotatable therewith; and elements on said housing, engaged by said pawl, that interrupts the rotation of said pawl and shaft; said elements including at least one deflecting pin.

6. An incremental motion control comprising a housing; a rotatable shaft in said housing having torque and torque release applied thereto; a driver slidable on said shaft and freely rotatable thereabout; means that limits the sliding movement of said driver in one direction; a spring loaded pawl on said driver; means on said shaft and rotatable therewith that rotates said driver and pawl when torque is applied and diminishes the vibratory shock of the pawl as it is rotated; said second named means limiting the sliding movement of said driver in one direction; a rotatable driven assembly interconnected to said shaft and rotatable therewith; and elements on said housing that interrupts the rotation of said driver and pawl.

7. An incremental motion control comprising a housing; a rotatable shaft in said housing having torque and torque release applied thereto; a driver slidable on said shaft and freely rotatable thereabout; means that limits the sliding movement of said driver in one direction; a spring loaded pawl on said driver; means on said shaft and rotatable therewith that rotates said driver and pawl when torque is applied and diminishes the vibratory shock of the pawl as it is rotated; said second named means limits the sliding movement of said driver in one direction; a rotatable driven assembly interconnected to said shaft and rotatable therewith; and elements on said housing that interrupts the rotation of said driver and pawl; said elements including at least one pawl deflecting pin.

8. An incremental motion control comprising a housing; a rotatable shaft in said housing having torque and torque release applied thereto; a driver slidable on said shaft and freely rotatable thereabout; means that limits the sliding movement of said driver in one direction; a spring loaded pawl on said driver; means on said shaft and rotatable therewith that rotates said driver and pawl when torque is applied and diminishes the vibratory shock of the pawl as it is rotated; said second named means limits the sliding movement of said driver in one direction; a rotatable driven assembly interconnected to said shaft and rotatable therewith; and elements on said housing that interrupts the rotation of said driver and pawl; said elements including at least one pawl stop pin.

9. An incremental motion control comprising a housing; a rotatable shaft in said housing having torque and torque release applied thereto; a pawl that embraces said shaft; a plate freely slidable on said shaft; a resilient member on said plate; a spring secured to said shaft and bearing against said plate that urges said resilient member into interconnecting engagement with said pawl to rotate the latter when torque is applied and diminishes the vibratory shock of the pawl as it is rotated; a rotatable driven assembly interconnected to said shaft and rotatable therewith; and elements on said housing that extends into the path and interrupts the rotation of said pawl.

10. An incremental motion control comprising a housing; a rotatable shaft in said housing having torque and torque release applied thereto; a pawl that embraces said shaft; a plate freely slidable on said shaft; a resilient member on said plate; a spring secured to said shaft and bearing against said plate that urges said resilient member into interconnecting engagement with said pawl to rotate the latter when torque is applied and diminishes the vibratory shock of the pawl as it is rotated; a rotatable driven assembly interconnected to said shaft and rotatable therewith; and elements on said housing that extends into the path and interrupts the rotation of said pawl; said elements including at least one deflecting pin.

11. An incremental motion control comprising a housing; a rotatable shaft in said housing having torque and torque release applied thereto; a pawl that embraces said shaft; a plate freely slidable on said shaft; a resilient member on said plate; a spring secured to said shaft and bearing against said plate that urges said resilient member into interconnecting engagement with said pawl to rotate the latter when torque is applied and diminishes the vibratory shock of the pawl as it is rotated; a rotatable driven assembly interconnected to said shaft and rotatable therewith; and elements on said housing that extends into the path and interrupts the rotation of said pawl; said elements including at least one stop pin.

References Cited in the file of this patent

UNITED STATES PATENTS

| Number | Name | Date |
|---|---|---|
| 815,578 | Brown | Mar. 20, 1906 |
| 1,577,757 | Re Qua | Mar. 23, 1926 |
| 1,891,101 | Le Count | Dec. 13, 1932 |
| 2,023,235 | Le Count | Dec. 3, 1935 |
| 2,360,488 | Garman | Oct. 17, 1944 |
| 2,512,894 | Gieskieng | June 27, 1950 |
| 2,625,833 | Johnson | Jan. 20, 1953 |
| 2,753,703 | McIntyre | July 10, 1956 |